E. M. STERNBERG.
TRANSMISSION GEAR.
APPLICATION FILED NOV. 29, 1907.
900,792.
Patented Oct. 13, 1908.
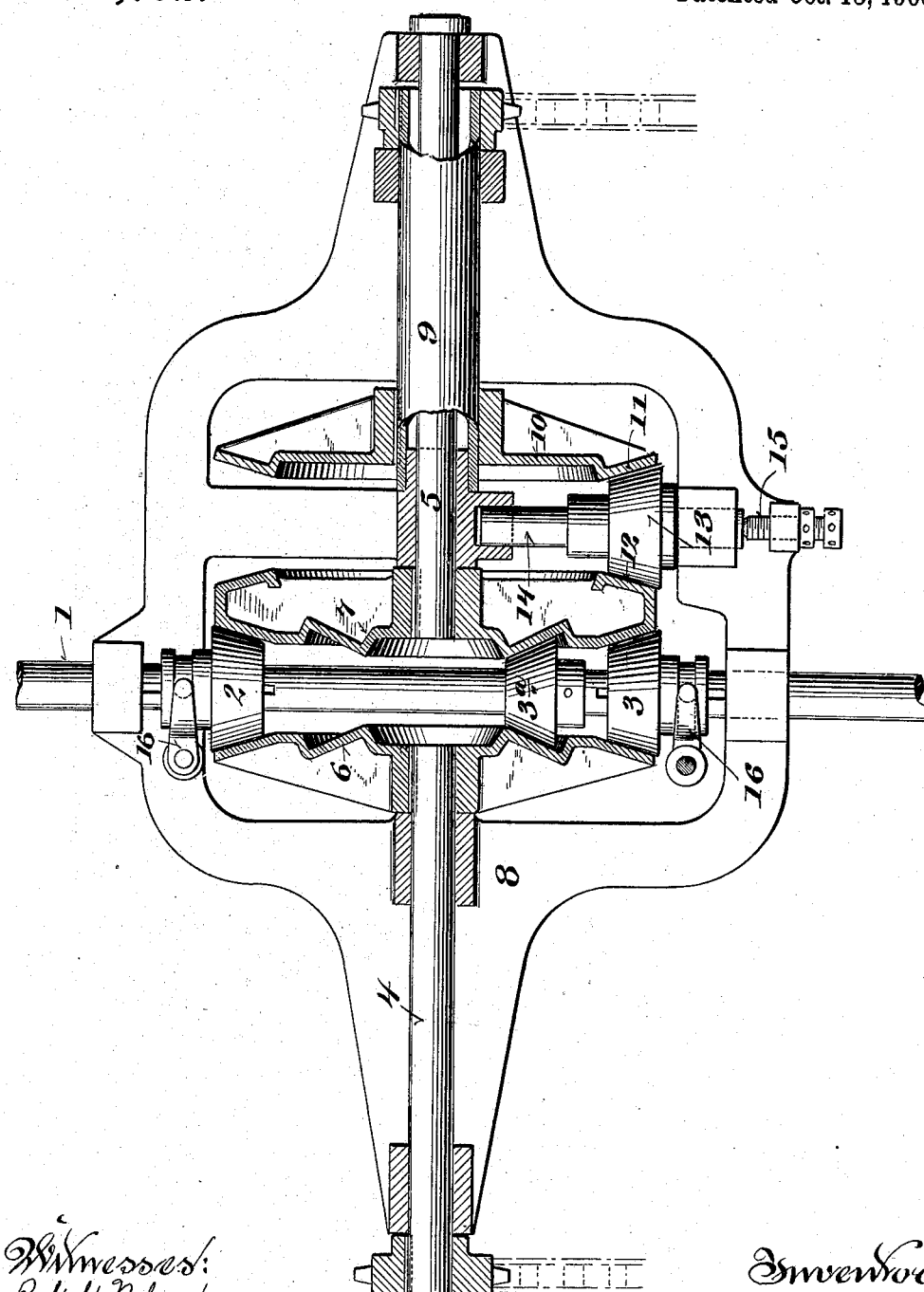

UNITED STATES PATENT OFFICE.

ERNST M. STERNBERG, OF MILWAUKEE, WISCONSIN.

TRANSMISSION-GEAR.

No. 900,792.  Specification of Letters Patent.  Patented Oct. 13, 1908.

Application filed November 29, 1907. Serial No. 404,315.

*To all whom it may concern:*

Be it known that I, ERNST M. STERNBERG, a citizen of the United States, and resident of Milwaukee, in the county of Milwaukee and State of Wisconsin, have invented certain new and useful Improvements in Transmission-Gears; and I do hereby declare that the following is a full, clear, and exact description thereof.

The object of my invention is to provide simple, durable and effective gearing, it being especially applicable to self-propelled vehicles, the invention consisting in certain details of construction and combination of parts as hereinafter fully set forth with reference to the accompanying drawing and subsequently claimed.

The drawing represents a plan view, partly in section, of a transmission-gear embodying the features of my invention.

Referring by numerals to the drawing, 1 indicates a power-shaft having friction cone-wheels 2, 3, in spline-connection therewith, a third cone-wheel 3ª being secured to the shaft intermediate of the first named cones. The friction cones 3 and 3ª are provided for transmitting forward variable speed to transverse counter-shafts 4, 5, which shafts are axially alined with relation to each other, the cone 2 being utilized as a reverse drive for these two shafts. To the counter-shafts are secured oppositely disposed disks or wheels 6, 7, having double beveled faces of differential diameters for frictional engagement with the several cones, the inner bevel faces of the disks being arranged to contact with the friction cone 2, whereby increased speed is imparted to the counter-shafts from the power-shaft aforesaid. The counter-shaft 4 is mounted in bearings of a bracket or frame 8, as is also the power-shaft, the shaft 5 being similarly mounted in bearings of this frame.

Revolubly supported in bearings of the frame 8 is a hollow arbor 9, which arbor is sleeved over the counter-shaft 5 and is adapted to rotate in the opposite direction therefrom. To the inner end of the arbor 9 is secured a third disk 10 having a bevel-face 11 oppositely disposed to a similar bevel-face 12 of the disk 7, these beveled faces being of the same diameter as that of the outer beveled face of the disk 6. Between the beveled face 11 of the disk 10 and the beveled face 12 of the disk 7, is fitted an idle friction wheel or cone 13, which cone is secured to a stud 14 that is fitted into bearings of the frame. The stud is longitudinally adjustable through a screw 15, which screw is in threaded-engagement with a lug of the frame 8, and is adapted to abut the adjacent stud end.

By means of above mechanism the frictional contact-pressure of the cone 13 upon bevel-faces 11 and 12 of the disks are regulated in accordance with the power required.

The outer ends of arbor 9 and counter-shaft 4 are each provided with sprocket-wheels, which may be employed to impart rotation directly to the axle of a vehicle, or to any source wherein it is essential that the direction of rotation be in same.

From the foregoing description it will be seen that motion imparted to the friction-disks 6 and 7 from any one of the driving-cones will cause rotation of the counter-shafts 4 and 5 in opposite directions. The motion of shaft 5 is, through its disk 7, transferred to the cone 13, which cone in turn drives the disk 10 that is carried by the arbor. The arbor in consequence will rotate in the same direction as the counter-shaft 4, and thus produce the desired direction of drive to the sprocket-wheel fast on said shaft and arbor, it being understood that said sprocket-wheels are provided for the purpose of direct chain-belt connection to the driving-wheels of a motor-vehicle or any mechanism wherein rotation in the same direction of separate members is desired. The cones 2 and 3 are provided with grooved collars for the reception of spanner-levers 16 fulcrumed in the frame, the levers being actuated to throw said cones in and out of frictional-engagement with the disks, as well as to control the driving-pressure required. This pressure is approximately double the pressure required to produce desired results in connection with the cone 13, for the reason that said cone, through its connections, is only required to drive one sprocket while the driving cones must have a pressure sufficient to sustain the entire load. Cone 3ª is thrown in and out of engagement with the adjacent bevel-faces of the disks by longitudinal adjustment of the power-shaft, which adjustment may be attained by any suitable mechanism forming no part of the invention. The driving-pressure of cone 13 against the adjacent bevel-faced disks, being slight in proportion to the pressure required for the power-shaft cones, permits the said cone 13 to slip at times when one of the counter-shafts is retarded, and thus act as a compensating gear when the device is used in connection with traction-wheels of a vehicle. In some instances, beveled-toothed gear-wheels may be substituted for the friction-wheels shown, in either case any well known form of compensating gear-mechanism may be applied to the hub of the intermediate cone 13 or its substituted bevel-gear pinion.

I claim:

1. In a transmission-gear, a power-shaft, axially alined transverse counter-shafts disposed on opposite sides of the power-shaft, a gear-wheel in connection with each counter-shaft, a driving gear-wheel carried by the power-shaft for engagement with the counter-shaft gear-wheels, an arbor revolubly mounted about one of said counter-shafts, a gear-wheel secured thereto, and an idle gear-wheel engaging the arbor gear-wheel and gear-wheel of the aforesaid counter-shaft about which said arbor is mounted.

2. In a transmission-gear, a power-shaft, axially alined transverse counter-shafts disposed on opposite sides of the power-shaft, a bevel gear-wheel in connection with each counter-shaft, a driving bevel gear-wheel carried by the power-shaft for engagement with the counter-shaft bevel gear-wheels, an arbor revolubly mounted about one of said counter-shafts, a bevel gear-wheel secured thereto, and an idle bevel gear-wheel engaging the arbor bevel gear-wheel and bevel gear-wheel of the aforesaid counter-shaft about which said arbor is mounted.

3. In a transmission-gear, a power-shaft, axially alined transverse counter-shafts disposed on opposite sides of the power-shaft, a friction bevel-wheel in connection with each counter-shaft, a friction cone-wheel carried by the power-shaft, for engagement with friction bevel-wheels of the counter-shafts, an arbor revolubly mounted about one of said counter-shafts, a friction bevel-wheel secured to the arbor, and an idle friction cone-wheel engaging the arbor friction bevel-wheel and friction bevel-wheel of the aforesaid counter-shaft about which said arbor is mounted.

4. In a transmission-gear, a power-shaft, axially alined transverse counter-shafts on opposite sides of the power-shaft, driving-gears connecting said power-shaft and counter-shafts, an arbor revolubly mounted about one of the counter-shafts, a gear-wheel secured to the arbor and an idle gear-wheel in gear-connection with the arbor gear-wheel and driving-gear connection of the power and counter-shafts, the idle gear being capable of permitting differential speed between the arbor and opposite counter-shaft.

5. In a transmission-gear, a power-shaft, axially alined transverse counter-shafts on opposite sides of the power-shaft, a wheel secured to one of the counter-shafts, having a bevel face upon one side, a wheel secured to the other counter-shaft having bevel-faces on opposite sides, cones carried by the power-shaft for engagement with the adjacent bevel-faces of said counter-shaft wheels, an arbor revolubly mounted about that counter-shaft having secured thereto the oppositely bevel-faced wheel, a bevel-faced wheel secured to the arbor, and an adjustable idle cone for engagement with the bevel-face of the arbor wheel and adjacent bevel-face of the counter-shaft wheel.

In testimony that I claim the foregoing I have hereunto set my hand at Milwaukee in the county of Milwaukee and State of Wisconsin in the presence of two witnesses.

E. M. STERNBERG.

Witnesses:
GEORGE FELBER,
RALPH NELSON.